(12) United States Patent
Pan et al.

(10) Patent No.: US 8,637,600 B2
(45) Date of Patent: Jan. 28, 2014

(54) PROCESSING OF RUBBER COMPOSITIONS INCLUDING SILICEOUS FILLERS

(75) Inventors: Xiao-Dong Pan, Akron, OH (US);
Zengquan Qin, Copley, OH (US);
Yuan-Yong Yan, Copley, OH (US);
Jessica Kurasch, Richfield, OH (US)

(73) Assignee: Bridgestone Corporation, Tokyo (JP)

( * ) Notice: Subject to any disclaimer, the term of this patent is extended or adjusted under 35 U.S.C. 154(b) by 243 days.

(21) Appl. No.: 13/207,694

(22) Filed: Aug. 11, 2011

(65) Prior Publication Data

US 2012/0059113 A1    Mar. 8, 2012

Related U.S. Application Data

(60) Provisional application No. 61/372,834, filed on Aug. 11, 2010.

(51) Int. Cl.
*C08K 3/34* (2006.01)
*C08L 9/00* (2006.01)

(52) U.S. Cl.
USPC .......................................... 524/492; 524/575

(58) Field of Classification Search
USPC ......................................................... 524/492
See application file for complete search history.

(56) References Cited

U.S. PATENT DOCUMENTS

| | | | |
|---|---|---|---|
| 2,721,804 A | 10/1955 | Rosenwald | |
| 2,934,518 A * | 4/1960 | Smith ........................... | 524/291 |
| 4,038,256 A | 7/1977 | Finelli et al. | |
| 4,158,378 A | 6/1979 | Pearson et al. | |
| 4,181,545 A | 1/1980 | Anderson | |
| 4,182,803 A | 1/1980 | Kanagawa et al. | |
| 4,321,343 A | 3/1982 | Rooney | |
| 4,499,243 A | 2/1985 | Rader | |
| 4,550,142 A | 10/1985 | Akita et al. | |
| 4,975,491 A | 12/1990 | Quirk | |
| 5,081,191 A | 1/1992 | Quirk | |
| 5,153,291 A | 10/1992 | Leitz et al. | |
| 5,336,726 A | 8/1994 | DuBois | |
| 5,455,307 A | 10/1995 | Terry et al. | |
| 5,523,337 A | 6/1996 | Banerjee et al. | |
| 5,674,798 A | 10/1997 | Kitamura et al. | |
| 5,695,747 A | 12/1997 | Forestier et al. | |
| 5,780,551 A | 7/1998 | Engel et al. | |
| 6,242,522 B1 | 6/2001 | Ezawa et al. | |
| 6,265,490 B1 | 7/2001 | Morel-Fourrier et al. | |
| 6,380,288 B1 | 4/2002 | Hojo et al. | |
| 6,838,539 B2 | 1/2005 | Hogan et al. | |
| 6,992,147 B1 | 1/2006 | Ozawa et al. | |
| 7,056,985 B2 | 6/2006 | Faust et al. | |
| 7,208,171 B2 | 4/2007 | Messersmith et al. | |
| 7,226,979 B2 | 6/2007 | Faust et al. | |
| 7,279,527 B2 | 10/2007 | Harwood et al. | |
| 7,342,070 B2 | 3/2008 | Tsukimawashi et al. | |
| 7,405,262 B2 | 7/2008 | Antkowiak et al. | |
| 7,618,937 B2 | 11/2009 | Messersmith et al. | |
| 7,858,679 B2 | 12/2010 | Messersmith et al. | |
| 7,897,665 B2 | 3/2011 | Kameda et al. | |
| 2003/0087338 A1 | 5/2003 | Messersmith et al. | |
| 2003/0216522 A1 | 11/2003 | Oshima et al. | |
| 2005/0288398 A1 | 12/2005 | Messersmith et al. | |
| 2006/0074197 A1 | 4/2006 | Hogan et al. | |
| 2006/0264589 A1 | 11/2006 | Yan | |
| 2008/0149566 A1 | 6/2008 | Messersmith et al. | |
| 2008/0171012 A1 | 7/2008 | Messersmith et al. | |
| 2010/0286348 A1 * | 11/2010 | Pan et al. ........................ | 526/84 |
| 2010/0330025 A1 | 12/2010 | Messersmith et al. | |
| 2011/0028632 A1 | 2/2011 | Qin et al. | |

FOREIGN PATENT DOCUMENTS

| | | |
|---|---|---|
| EP | 0 442 068 A2 | 12/1990 |
| JP | H05-230126 | 9/1993 |
| JP | H07-258476 | 10/1995 |
| JP | 2003-003015 A | 1/2003 |
| JP | 2007-211054 | 8/2007 |
| WO | WO 2008/019461 A2 | 1/2011 |
| WO | WO 2011/002994 A2 | 1/2011 |
| WO | WO 2011/008501 A2 | 1/2011 |

OTHER PUBLICATIONS

G. Westwood et al., "Simplified Polymer Mimics of Cross-Linking Adhesive Proteins," *Macromolecules*, May 4, 2007, pp. 3960-3964, 2007, 40 (American Chemical Society; Washington, D.C.).

S. Ganguly et al., "Effect of surface modification of carbon black of 1,2-dihydroxy benzene and 1,2,3-trihydroxy benzene on a natural rubber-carbon black composite," *Indian J. Chem. Technol.*, 2005, pp. 695-700, vol. 12, No. 6 (Council of Scientific & Industrial Research; New Delhi, India)—abstract only.

A. Banerjee, "Novel approach of rubber-filler interaction through surface modification of carbon black," version of article that appeared in Apr. 2003 *Rubber World Magazine*—article downloaded from thefreelibrary.com.

A. Hirai et al., "Polymerization of Monomers Containing Functional Groups Protected by Trialkylsilyl Groups, 1—Synthesis of Poly(4-vinylphenol) by Means of Anionic Living Polymerization," *Makromol. Chem., Rapid Commun.*, 1982, 3, pp. 941-946.

K. Jankova, "Synthesis by ATRP of poly(ethylene-*co*-butylene)-*block*-polystyrene, poly(ethylene-*co*-butylene)-*block*-poly(4-acetoxystyrene) and its hydrolysis product poly(ethylene-*co*-butylene)-*block*-poly(hydroxystyrene)," *Macromol. Rapid Commun.*, 1999, 20, pp. 219-223 (Wiley-VCH Verlag GmbH; Weinheim, Germany).

K Satoh et al., "Direct Living Cationic Polymerization of p-Hydroxystyrene with Boron Trifluoride Etherate in the Presence of Water," Macromolecules, Jul. 8, 2000, pp. 5405-5410, 2000, 33 (American Chemical Society; Washington, D.C.).

* cited by examiner

*Primary Examiner* — Hui Chin
(74) *Attorney, Agent, or Firm* — Meredith E. Hooker; David G. Burleson

(57) ABSTRACT

Vulcanizates with desirable properties can be obtained from compositions incorporating polymers that include hydroxyl group-containing aryl functionalities, silica or other particulate filler(s) that contain or include oxides of silicon and a compound that includes multiple hydroxyl groups. The compound can act to disrupt the interactivity of the functionalities and the particulate filler particles during processing of the composition, thereby facilitating processing of the composition.

20 Claims, No Drawings

PROCESSING OF RUBBER COMPOSITIONS INCLUDING SILICEOUS FILLERS

CROSS-REFERENCE TO RELATED APPLICATION

This application claims the benefit of U.S. provisional patent appl. No. 61/372,834, filed Aug. 11, 2010, the disclosure of which is incorporated herein by reference.

BACKGROUND INFORMATION

Rubber goods such as tire treads are made from elastomeric compositions that contain one or more reinforcing materials; see, e.g., *The Vanderbilt Rubber Handbook*, 13$^{th}$ ed. (1990), pp. 603-04.

The first material commonly used as a filler was carbon black, which imparts good reinforcing properties and excellent wear resistance to rubber compositions. However, carbon black-containing formulations often suffer from increased rolling resistance which correlates with an increase in hysteresis and heat build-up during operation of the tire, properties which need to be minimized to increase motor vehicle fuel efficiency. Increased hysteresis resulting from the use of carbon black can be somewhat counteracted by reducing the amount and/or increasing the particle size of the carbon black particles, but the risks of deterioration in reinforcing properties and wear resistance limits the extent to which these routes can be pursued.

Over the last several decades, use of amorphous silica and treated variants thereof, both alone and in combination with carbon black, has grown significantly. Use of silica fillers can result in tires with reduced rolling resistance, increased traction on wet surfaces (one of the primary evaluation criteria for tire treads), and other enhanced properties.

In the search for further and/or additional enhancements, alternative or non-conventional fillers have been investigated. Examples include various metal hydroxides and oxides, macroscopic (e.g., 10-5000 μm mean diameter) particles of hard minerals such as CaCO$_3$ and quartz, pumice containing SiO$_2$, micron-scale metal sulfates, as well as clays and complex oxides.

Regardless of the type(s) of reinforcing filler(s) used in a rubber compound, enhancing dispersion of the filler(s) throughout the polymers can improve processability of the compound (rubber composition) and certain physical properties of vulcanizates made therefrom. Efforts in this regard include high temperature mixing in the presence of selectively reactive promoters, surface oxidation of compounding materials, surface grafting, and chemically modifying the polymer(s), often at one or both of its termini. Terminal chemical modification can occur by reaction of a terminally active, i.e., living (i.e., anionically initiated) or pseudo-living, polymer with a functional terminating agent. Terminal modification also can be provided by means of a functional initiator, in isolation or in combination with functional termination. Functional initiators typically are organolithium compounds that additionally include other functionality, typically functionality that includes a nitrogen atom.

Polymers incorporating 3,4-dihydroxyphenylalanine (DOPA) have been synthesized for some time, often for adhesive applications; see, e.g., U.S. Pat. No. 4,908,404. Because these polymers can be costly and difficult to produce, so-called bulk polymers approximating their performance have been pursued. Westwood et al., "Simplified Polymer Mimics of Cross-Linking Adhesive Proteins," *Macromolecules* 2007, 40, 3960-64, describe one such process, although the deprotection step employed cannot be used when the polymer contains ethylenic unsaturation. Less restrictive approaches are described in international patent publication nos. WO 2009/086490 and WO 2011/002930, each of which describes the production of functional polymers that exhibit excellent interaction with various types of reinforcing fillers. Enhanced interactivity between polymer chains and particulate fillers typically results in reduced hysteresis as evidenced by reduced tan δ values at elevated temperatures (e.g., 50° to 60° C.).

Polymer chains that include hydroxyl group-containing aryl functionality tend to interact very strongly with other similar chains as well as with hydroxide- and oxide-type particulate fillers, including silica. While the latter can be a desirable trait during use (e.g., after a vulcanizate is prepared from a rubber composition), these interactions can negatively impact processability of the rubber composition itself. More specifically, such rubber compositions can exhibit extremely high compound Mooney viscosity values, a characteristic that increases the amount of energy that must be inputted to ensure proper mixing and processing of the composition.

SUMMARY

Vulcanizates with desirable properties can be obtained from compositions employing polymers that include a hydroxyl group-containing aryl functionality, silica (or other types of filler(s) that contains oxides of silicon, e.g., kaolin clay) and at least one processing viscosity modifier. The processing viscosity modifier acts to significantly reduce the compound Mooney viscosity of the composition, thereby facilitating processing of the composition relative to an identical composition that does not include the processing viscosity modifier.

The composition can be provided by blending a polymer with filler particles that include oxides of silicon in the presence of a compound having multiple hydroxyl functionalities. The polymer includes ethylenic unsaturation, typically provided from polyene mer, and pending or terminal functionality that includes an aryl group including at least one, preferably two, OR substituents, wherein R is H or a hydrolyzable protecting group. The compound can be solid at ambient temperatures. The rubber composition can be used to provide vulcanizates having desirable properties.

The aforementioned processing viscosity modifier can have the general formula $$R^1(OH)_a \qquad (I)$$

where a is an integer of 2 or more and $R^1$ represents a substituted or unsubstituted organic (typically alkyl, aryl, or cycloalkyl) compound. In certain embodiments, the compound can have a melting point of less than ~170° C., often from ~40° to ~165° C.

Additionally or alternatively, the polymer that includes ethylenic unsaturation and pending or terminal functionality that includes an aryl group including at least one, preferably two, OR substituents (referred to herein as a "functionalizing unit") can be provided in a variety of ways. First, the functionalizing unit can be provided from initiating compounds that have the general formula $$R^3ZQ\text{-}M \qquad (II)$$

where M is an alkali metal atom; $R^3$ is an aryl group having at least one $OR^4$ substituent group where each $R^4$ is a hydrolyzable protecting group that also is nonreactive toward M (with $R^3$ optionally including additional substituents and/or heteroatoms); Z is a single bond or a substituted or unsubstituted alkylene (acyclic or cyclic) or arylene group; and Q is a group bonded to M through a C, N or Sn atom. The $R^3$ aryl group can include a single aromatic ring (phenyl group) or two or more fused aromatic rings. Initiation with this type of functional initiator can result in a macromolecule that includes at least one polymer chain having terminal functionality defined by the general formula $$-Q'ZR^5 \quad (III)$$

or a functionalized polymer defined by the general formula $$\kappa\text{-}\pi\text{-}Q'ZR^5 \quad (IV)$$

where $R^5$ is an aryl group that includes at least one OR substituent group (optionally including one or more other types of substituents); Z is defined as above; Q' is the radical of Q, i.e., the residue of an initiating moiety bonded to the polymer chain through a C, N or Sn atom; π is a polymer chain; and κ is a hydrogen atom or a functional group-containing radical generated by reaction of the polymer with a terminating compound. Where more than one OR group is present in $R^5$, each can be on the same or different rings and, in certain embodiments, at least two OR substituents can be adjacent.

Where a functionalizing unit results from incorporation of a monomer, the monomer and resulting mer unit can include an aryl group, preferably a phenyl group, that has at least one directly bonded OR group. The resulting polymer can include multiple mer resulting from incorporation of polyenes (A units) and at least two, preferably at least three, mer of the type just described (B units) which can be non-adjacent or can constitute a block within the polymer. If a block of B units is present, it can be relatively close to a terminus of the polymer, i.e., no more than six, four or two polymer chain atoms from a terminal unit. In other embodiments, one or more B units can be incorporated into the polymer, typically after polymerization of the other monomers has been accomplished, optionally followed by reaction with a compound which optionally can provide additional terminal functionality to the polymer. (This compound need not be of a type capable of providing the specific functionality shown below in formula V and, instead, can provide any of a variety of functionalities including, inter alia, those containing one or more heteroatoms.)

Where a functionalizing unit results from reaction of a reactive polymer with a terminating compound, that functionality can have the general formula $$\begin{array}{c} -Q''Z'R^5 \\ | \\ R^6 \end{array} \quad (V)$$

where Z' is a single bond or an alkylene group; $R^5$ is defined as above, preferably including at least two OR substituent groups; $R^6$ is H, a substituted or unsubstituted aryl group which optionally can include one or more hydrolyzable protecting groups, R', or JR' where J is O, S, or —NR' (with each R' independently being a substituted or unsubstituted alkyl group); and Q" is the residue of a functionality that is reactive with at least one type of reactive polymers but which itself is non-reactive toward such polymers.

In formulas III-V, the $R^5$ aryl group can include a single aromatic ring (phenyl group) or two or more fused aromatic rings, and the hydrolyzable protecting groups can be on the same or different rings of the aryl group although, in certain embodiments, the hydrolyzable protecting groups advantageously can be adjacent. In formula V, $R^6$ and a portion of $R^5$ can be linked so that, together with one or more atoms of the Q" group to which they are bonded (and optionally Z'), they form a ring that is bound to or fused with the $R^5$ aryl group; examples include any of a variety of flavone- and anthrone-type structures which have one or more hydrolyzable protecting groups on at least one of the aryl groups. This is described in more detail below in connection with formula Vb.

In certain embodiments, the polyene(s) can be conjugated dienes. In these and other embodiments, the polymer also can include vinyl aromatic mer which preferably are incorporated substantially randomly with the conjugated diene mer along the polymer chain.

In each of the foregoing, the polymer can be substantially linear. In certain embodiments, the substantially linear polymer can include as a terminal moiety the radical of a compound that includes at least one aryl group having one or more substituent groups that can be hydrolyzed to hydroxyl groups.

Other aspects will be apparent to the ordinarily skilled artisan from the description of various embodiments that follows. In that description, the following definitions apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"random interpolymer" means an interpolymer having mer units derived from each type of constituent monomer incorporated in an essentially non-repeating manner and being substantially free of blocks, i.e., segments of three or more of the same mer;

"reactive polymer" means a polymer having at least one site which, because of the presence of an associated catalyst or initiator, readily reacts with other molecules, with the term being inclusive of, inter alia, pseudo-living and carbanionic polymers;

"catalyst composition" is a general term encompassing a simple mixture of ingredients, a complex of various ingredients that is caused by physical or chemical forces of attraction, a chemical reaction product of some or all of the ingredients, or a combination of the foregoing, the result of which is a composition displaying catalytic activity with respect to one or more monomers of the appropriate type;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"substituted" means containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"non-coordinating anion" means a sterically bulky anion that does not form coordinate bonds with the active center of a catalyst system due to steric hindrance;

"non-coordinating anion precursor" means a compound that is able to form a non-coordinating anion under reaction conditions;

"radical" means the portion of a molecule that remains after reacting with another molecule, regardless of whether any atoms are gained or lost as a result of the reaction;

"aryl group" means a phenyl group or a polycyclic aromatic radical;

"terminus" means an end of a polymeric chain; and

"terminal moiety" means a group or functionality located at a terminus.

Throughout this document, all values given in the form of percentages are weight percentages unless the surrounding text explicitly indicates a contrary intention. The relevant portions of any mentioned patent or patent publication is incorporated herein by reference.

DETAILED DESCRIPTION OF ILLUSTRATIVE EMBODIMENTS

As apparent from the foregoing Summary, the method can involve any of a variety of possible permutations or combinations thereof, and the resulting rubber compound or composition can be characterized in a variety of ways. Generally, a functionalized polymer of the composition includes mer derived from one or more polyenes, particularly dienes, and terminal functionality defined by either or both of formulas III and V and/or one or more of the aforedescribed B mer units; in at least certain embodiments, the polymer also can include directly bonded pendent aromatic groups. This type of polymer is blended with filler particles that include oxides of silicon as well as at least one processing viscosity modifier as described more specifically elsewhere herein.

The polymer and its methods of production are described first, followed by the manner in which it can be incorporated into filled compositions as well as the processing of those compositions into cured (vulcanized) goods.

While a rubber composition often involves a blend of several types of polymers, at least one of the polymers involved in the process of the present invention includes at least one unit, either a constituent mer or a terminal functionality, that includes hydroxyl functionality. This polymer includes multiple A mer (i.e., polyene units), optionally, multiple C mer (i.e., units that include a pendent aryl group, particularly a phenyl group), and, where at least some of the desired functionalization is to be derived from functional monomers, at least one B mer, i.e., a unit that includes a pendent aryl, preferably phenyl, group with at least one directly bonded OR group. Each of the A, B and C mer can result from incorporation of ethylenically unsaturated monomers.

The A mer typically result from incorporation of polyenes, particularly trienes (e.g., myrcene) and dienes, particularly $C_4$-$C_{12}$ dienes and even more particularly conjugated dienes such as 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, isoprene, 4-methyl-1,3-pentadiene, 2,4-hexadiene, and the like. Some or all of the A mer can be derived from one or more types of dienes, particularly one or more types of conjugated dienes, e.g., 1,3-butadiene. In some embodiments, essentially all (i.e., at least 95%) of the polyenes can be dienes, particularly conjugated dienes.

Polyenes can incorporate into polymeric chains in more than one way. Especially for tire tread applications, controlling this manner of incorporation can be desirable. A polymer chain with an overall 1,2-microstructure, given as a numerical percentage based on total number of polyene units, of from ~10 to ~80%, optionally from ~25 to ~65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be substantially linear. For certain end use applications, keeping the content of 1,2-linkages even lower, e.g., to less than about 7%, less than 5%, less than 2%, or less than 1%, can be desirable.

Depending on the intended end use, one or more of the polymer chains can include pendent aromatic groups, which can be provided by C mer, i.e., mer derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, C mer can constitute from ~1 to ~50%, from ~10 to ~45%, or from ~20 to ~40% of the polymer chain; random microstructure can provide particular benefit in some end use applications such as, e.g., rubber compositions used in the manufacture of tire treads. Where a block interpolymer is desired, C units can constitute from ~1 to ~90%, generally from ~2 to ~80%, commonly from ~3 to ~75%, and typically ~5 to ~70% of the polymer chain. (In this paragraph, all percentages are mole percentages.)

Exemplary interpolymers include those in which one or more conjugated dienes are used to provide the A units, i.e., polydienes; among these, 1,3-butadiene can be one of several or the only polydiene employed. Where C units are desired, they can be provided from styrene so as to provide, for example, SBR. In each of the foregoing types of exemplary interpolymers, one or more B units also can be incorporated.

B units include a pendent aryl group which includes one or more directly bonded hydroxyl groups. Because the H atoms of hydroxyl groups are active and can interfere with certain polymerization processes, the B unit(s) typically is/are provided from compounds that include R groups, i.e., groups that are non-reactive in the types of conditions utilized when polymerizing ethylenically unsaturated monomers but which later can be removed, typically by hydrolysis or similar reaction, so as to provide the desired hydroxyl groups. The particular type(s) of protecting group(s) employed should not interfere with the polymerization process, and the de-protection process employed to provide hydroxyl groups should not destroy or otherwise react with ethylenic unsaturation in the polymer resulting from the presence of A units. A non-limiting class of useful protecting groups is trialkylsiloxy groups, which can be provided by reacting hydroxyl groups with a trialkylsilyl halide. While the following examples employ tert-butyldimethylsiloxy groups, others such as acetal, tert-butyl ether, 2-methoxyethoxy ether, and the like also can be useful.

The number of OR groups on the aryl, typically phenyl, group of each B unit need not be the same, where the number is the same, the OR groups need not be at the same position(s) on those rings. Using a phenyl group as a representative aryl group, relative to the point of attachment of the phenyl group to the polymer chain, a single OR group can be located ortho, meta, or para on the phenyl ring, while multiple OR groups can be provided 2,3-, 2,4-, 2,5-, 2,6-, 3,4-, 3,5-, 3,6-, 2,3,4-, 2,3,5-, etc., on the phenyl ring.

B units typically are provided from vinyl aromatic compounds that include one or more hydroxyl-producing groups directly attached to their aryl, typically phenyl, rings. Such compounds can be represented by the general formula $$CH_2=CHR^3 \qquad (VI)$$

where $R^3$ is defined as above and which here can include from 1 to 5 inclusive $OR^4$ groups with each $R^4$ independently being the type of protecting group described above. (Although each $R^4$ need not be identical, ease and simplicity typically result in a single type of $R^4$ moiety being used in a given compound.) The $OR^4$ groups can be substituents of the same ring of $R^3$ or can be substituents of different rings and, where $R^3$ contains three or more $OR^4$ groups, two of them can be substituents of one ring with the other(s) being substituent(s) of other ring(s). In one embodiment, two $OR^4$ groups can be at the 3 and 4 positions of the same ring within the aryl group, preferably a phenyl group. Where $R^3$ is other than a phenyl group and includes more than one $OR^4$ group and where the $OR^4$ groups are on more than one ring, at least two of the $OR^4$ groups preferably are least somewhat proximate, i.e., directly bonded to ring C atoms that are separated by no more than 4, preferably 3, and even more preferably 2, other ring atoms. Many of these compounds advantageously are soluble in the types of organic solvents set forth below.

When one or more formula VI-type compounds is polymerized, it/they provide the B unit(s), after which each of the $R^4$ moieties can be hydrolyzed so as to provide phenolic hydroxyl groups.

The number of B units typically is small relative to the number of A units and, if present, C units; a relatively small number of B units has been found to provide a satisfactory level of desired properties, with further improvements in those properties not necessarily being proportional to the number of B units present. This relatively small number can be expressed in a number of ways. For example, the weight percentage of the final polymer attributable to B units commonly is less than 2%, more commonly from ~0.1 to ~1.5%, and typically from ~0.2 to ~1.0%. The percentage of B mer relative to the total number of mer in the polymer commonly is less than 1%, more commonly from ~0.01 to ~0.75%, and typically from ~0.05 to ~0.5%. The total number of B units in a given polymer generally is from 1 to several dozen, commonly from 1 to 12, more commonly from 1 to 10, and most commonly from 1 to 5.

The B units can be separated from one another, or two or more B units can be contiguous along the polymer chain. (While the ordinarily skilled artisan understands how to synthesize random and block interpolymers, each is discussed in some detail below.) Further, the B units can incorporated near the beginning of the polymerization, near the end of the polymerization, or at any one or more intermediate points; in the first two of the foregoing possibilities, a B unit can be provided within 6 chain atoms of, within 2 units of, adjacent to a terminus of the polymer, or as a terminal unit, either alone or as part of a block.

The foregoing types of polymers can be made by emulsion polymerization or solution polymerization, with the latter affording greater control with respect to such properties as randomness, microstructure, etc. Solution polymerization techniques are familiar to the ordinarily skilled artisan, so only general aspects in the form of an overview description are provided here for convenience of reference.

Both polar solvents, such as THF, and non-polar solvents can be employed in solution polymerizations, with the latter type being more common in industrial practice. Examples of non-polar solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

Depending on the nature of the polymer desired, the particular conditions of the solution polymerization can vary significantly. In the discussion that follows, anionic polymerizations are described first followed by a description of coordination catalyzed polymerizations that can result in pseudo living polymers. After these descriptions, optional functionalization and processing of polymers so made are discussed.

Anionic polymerizations involve an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include sulfur atom-containing cyclic compounds (see, e.g., U.S. Pat. Nos. 7,153,919 and 7,612,144), other heteroatom-containing cyclic compounds (see, e.g., U.S. Pat. Publ. No. 2011/0009583 A1), and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815). Use of a N atom-containing initiator such as, for example, lithiated HMI, can further enhance interactivity between the polymer chains and carbon black particles.

Some of the just-described functional initiators are poorly soluble in many of the solvents set forth above, however, particularly those solvents that are relatively non-polar. In contradistinction, many compounds included in formula II exhibit acceptable solubility in the types of organic liquids commonly employed as solvents in solution polymerizations. Compounds included within this formula hereinafter are referred to as $R^3$-containing initiators. A full description of these initiators can be found in U.S. Pat. Publ. No. 2010/0286348 A1, although an abbreviated description is provided here for ease of reference.

The aryl group of the $R^3$-containing initiator can be a phenyl group or two or more fused aromatic rings. Where the $R^3$ aryl group includes more than one $OR^4$ group (with each $R^4$ being nonreactive toward M), the $OR^4$ groups can be substituents of the same ring or of different rings within the aryl group; where the aryl group contains three or more $OR^4$ groups, two of them can be substituents of one ring with the other(s) being substituent(s) of other ring(s).

The $R^4$ moieties of the $R^3$-containing initiator ensure that no active H atoms are present in the $R^3$ aryl group. Such active H atoms would interfere with the ability of the $R^3$-containing initiator to anionically initiate polymerizations. Unless a particular $R^4$ moiety constitutes a group that is capable of providing interactivity with particulate filler, it preferably also is capable of being hydrolyzed to a hydrogen atom. Trialkylsiloxy groups are a non-limiting example of the type of group that can serve these dual purposes; such groups can be provided by reacting hydroxyl groups attached to the $R^3$ aryl group with a trialkylsilyl halide. Although each $R^4$ need not be identical, ease and simplicity typically result in a single type of $R^4$ moiety for a given $R^3$-containing initiator.

When the $R^3$-containing initiator initiates polymerization, its radical forms one end of a polymer chain (see formulas III and IV). The $R^4$ moieties of this radical typically are hydrolyzed so as to provide hydroxyl substituents to the $R^5$ group of formulas III and IV. This type of $R^5$ group has been found to provide excellent interactivity with a wide variety of particulate fillers including carbon black and silica as well as non-conventional fillers such as inorganic oxides and hydroxides, clays and the like.

In the $R^3$-containing initiator, M is an alkali metal atom (preferably a K, Na or Li atom, most preferably a Li atom), and Q is a group bonded to M through a C, N or Sn atom. Generally, Q does not contain any active H atoms which, as appreciated by the ordinarily skilled artisan, interfere with the efficacy of the $R^3$-containing initiator. Potentially useful Q groups include, but are not limited to, thioacetals; $SnR^7{}_2$ groups where each $R^7$ independently is a hydrocarbyl (e.g., alkyl, cycloalkyl, aryl, aralkyl, alkaryl, etc.) group or, together, form a cycloalkyl group, and $NR^8$ where $R^8$ is a hydrocarbyl group, particularly an aryl, a $C_3$-$C_8$ cycloalkyl, or a $C_1$-$C_{20}$ alkyl group; and any of a variety of linear or branched alkyl groups, non-limiting examples of which include butyl, pentyl, hexyl, heptyl, octyl, etc.

Compounds defined by formula II can be provided in a variety of ways, with the choice of synthetic route depending to a large extent on particular nature of Q. For example, a compound with multiple hydroxyl groups attached to an aryl group and at least one other functionality can react, through the other functionality, with a compound so as to provide a Q group; thereafter, the H atom(s) of the hydroxyl group(s) can be reacted with a compound that can provide the aforementioned $R^4$ groups, and the resulting material can be reacted with an alkali metal-containing material, e.g., an organolithium.

The $R^3$-containing initiator can be made external to the polymerization vessel where it is to act as an initiator. In this case, a blend of monomer(s) and solvent can be charged to the reaction vessel, followed by addition of initiator, which often is added as part of a solution or blend (i.e., in a solvent carrier). For reasons of convenience, the $R^3$-containing initiator typically is synthesized in situ.

Other potentially useful initiating compounds are described in international patent publ. no. WO 2011/008501, which can be prepared by reacting a formula VI-type compound with an organometallic compound, and para-substituted styrenic compounds that have been reacted with an alkali metal atom-containing compound; non-limiting examples of the types of styrenic compounds that can be used in the latter option include, but are not limited to,

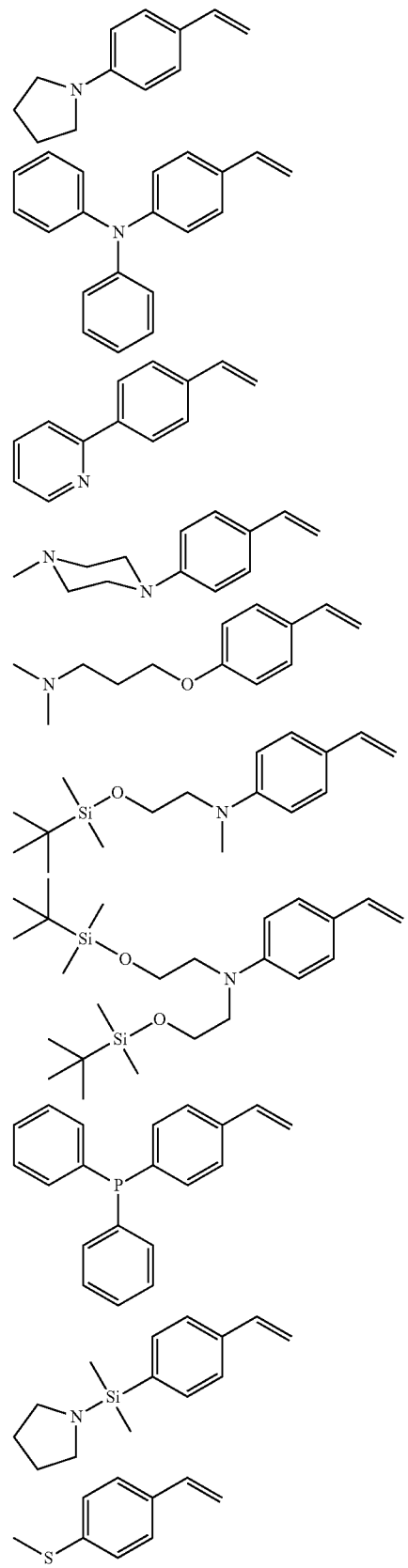

Although the ordinarily skilled artisan understands the conditions typically employed in anionic polymerizations, a representative description is provided for ease of reference. The following is based on a batch process, although the ordinarily skilled artisan can adapt this description to, semi-batch, continuous, or other processes.

Anionic polymerizations typically begin by charging a blend of monomer(s) and solvent to a suitable reaction vessel, followed by addition of a coordinator (if used) and initiator, which often are added as part of a solution or blend; alternatively, monomer(s) and coordinator can be added to the initiator. Both randomization and vinyl content (i.e., 1,2-microstructure) can be increased through inclusion of a coordinator, usually a polar compound. Up to 90 or more equivalents of coordinator can be used per equivalent of initiator, with the amount depending on, for example, the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2'-di(tetrahydrofuryl)propane, di-piperidyl ethane, hexamethylphosphoramide, N,N'-dimethylpiperazine, diazabicyclooctane, diethyl ether, tributylamine, and the like.

Typically, a solution of polymerization solvent(s) and the monomer(s) is provided at a temperature of from about −80° to +100° C., more commonly from about −40° to +50° C., and typically from ~0° to +30° C.; to this solution is added an initiating compound or, where a functionalizing unit is to be provided from the initiator, and the $R^3$-containing initiator (or its precursor with an organolithium, typically an alkyllithium). The solution can have a temperature of from about −70° to ~150° C., more commonly from about −20° to ~120° C., and typically from ~10° to ~100° C. The polymerization is allowed to proceed under anhydrous, anaerobic conditions for a period of time sufficient to result in the formation of the desired polymer, usually from ~0.01 to ~100 hours, more commonly from ~0.08 to ~48 hours, and typically from ~0.15 to ~2 hours. After a desired degree of conversion has been reached, the heat source (if used) can be removed and, if the reaction vessel is to be reserved solely for polymerizations, the reaction mixture is removed to a post-polymerization vessel for functionalization and/or quenching.

Polymers made according to anionic techniques generally have a number average molecular weight ($M_n$) of up to ~500,000 Daltons. In certain embodiments, the $M_n$ can be as low as ~2000 Daltons; in these and/or other embodiments, the $M_n$ advantageously can be at least ~10,000 Daltons or can range from ~50,000 to ~250,000 Daltons or from ~75,000 to ~150,000 Daltons. Often, the $M_n$ is such that a quenched sample exhibits a gum Mooney viscosity ($ML_4$/100° C.) of from ~2 to ~150, more commonly from ~2.5 to ~125, even more commonly from ~5 to ~100, and most commonly from ~10 to ~75.

Certain end use applications call for polymers that have properties that can be difficult or inefficient to achieve via anionic (living) polymerizations. For example, in some applications, conjugated diene polymers having high cis-1,4-linkage contents can be desirable. Polydienes can be prepared by processes using coordination catalysts (as opposed to the initiators employed in living polymerizations) and may display pseudo living characteristics.

Certain types of catalyst systems are known to be useful in producing very stereo-specific 1,4-polydienes from conjugated diene monomers. Some catalyst systems preferentially result in cis-1,4-polydienes, while others preferentially provide trans-1,4-polydienes, and the ordinarily skilled artisan is familiar with examples of each type. The following description is based on a particular cis-specific catalyst system, although this merely is for sake of counter-cation and is not considered to be limiting to the functionalizing method and compounds.

Exemplary catalyst systems can employ lanthanide metals which are known to be useful for polymerizing conjugated diene monomers. Specifically, catalyst systems that include a lanthanide compound can be used to provide cis-1,4-polydienes from one or more types of conjugated dienes. Preferred lanthanide-based catalyst compositions include those described in U.S. Pat. No. 6,699,813 and patent documents cited therein. A condensed description is provided here for convenience and ease of reference.

Exemplary lanthanide catalyst compositions include (a) a lanthanide compound, an alkylating agent and a halogen-containing compound (although use of a halogen-containing compound is optional when the lanthanide compound and/or the alkylating agent contains a halogen atom); (b) a lanthanide compound and an aluminoxane; or (c) a lanthanide compound, an alkylating agent, and a non-coordinating anion or precursor thereof.

Various lanthanide compounds or mixtures thereof can be employed, with preference given to those which are soluble in aromatic, aliphatic, and/or cycloaliphatic liquids, although hydrocarbon-insoluble lanthanide compounds can be suspended in the polymerization medium. Preferred lanthanide compounds include those which include at least one Nd, La, or Sm atom or those including didymium. The lanthanide atom(s) in the lanthanide compounds can be in any of a number of oxidation states, although the +3 oxidation state is most common. Exemplary lanthanide compounds include carboxylates, organophosphates, organophosphonates, organophosphinates, xanthates, carbamates, dithiocarbamates, β-diketonates, alkoxides, aryl-oxides, halides, pseudo-halides, oxyhalides, etc.

Typically, the lanthanide compound is used in conjunction with one or more alkylating agents, i.e., organometallic compounds that can transfer hydrocarbyl groups to another metal. These agents typically are organometallic compounds of electropositive metals such as Groups 1, 2, and 3 metals. Exemplary alkylating agents include organoaluminum compounds and organomagnesium compounds. The former include (1) compounds having the general formula $AlR^9{}_xX'_{3-x}$ where x is an integer of from 1 to 3 inclusive, each $R^9$ independently is a monovalent organic group (which may contain heteroatoms such as N, O, B, Si, S, P, and the like) connected to the Al atom via a C atom and each X' independently is a hydrogen atom, a halogen atom, a carboxylate group, an alkoxide group, or an aryloxide group; and (2) oligomeric linear or cyclic aluminoxanes, which can be made by reacting trihydrocarbylaluminum compounds with water. The latter include compounds having the general formula $MgR^{10}{}_yX'_{2-y}$ where X' is defined as above, y is an integer of from 1 to 2 inclusive, and $R^{10}$ is the same as $R^9$ except that each monovalent organic group is connected to the Mg atom via a C atom.

Some catalyst compositions contain compounds with one or more labile halogen atoms. Useful halogen-containing compounds include elemental halogens, mixed halogens, hydrogen halides, organic halides, inorganic halides, metallic halides, organometallic halides, and mixtures thereof. The halogen-containing compounds preferably are soluble in solvents such as those described above with respect to lanthanide compounds, although hydrocarbon-insoluble compounds can be suspended in the polymerization medium.

Other catalyst compositions contain a non-coordinating anion or a non-coordinating anion precursor. Exemplary non-coordinating anions include tetraarylborate anions, particularly fluorinated tetraarylborate anions, and ionic compounds containing non-coordinating anions and a counteraction (e.g., triphenylcarbonium tetrakis(pentafluorophenyl)borate). Exemplary non-coordinating anion precursors include boron compounds that include strong electron-withdrawing groups.

Catalyst compositions of this type have very high catalytic activity for polymerizing conjugated dienes into stereospecific polydienes over a wide range of concentrations and ratios, although polymers having the most desirable properties typically are obtained from systems that employ a relatively narrow range of concentrations and ratios of ingredients. Further, the catalyst ingredients are believed to interact to form an active catalyst species, so the optimum concentration for any one ingredient can depend on the concentrations of the other ingredients. The following molar ratios are considered to be relatively exemplary for a variety of different systems based on the foregoing ingredients:

alkylating agent to lanthanide compound (alkylating agent/Ln): from ~1:1 to ~200:1, preferably from ~2:1 to ~100:1, more preferably from ~5:1 to ~50:1;

halogen-containing compound to lanthanide compound (halogen atom/Ln): from ~1:2 to ~20:1, preferably from ~1:1 to ~10:1, more preferably from ~2:1 to ~6:1;

aluminoxane to lanthanide compound, specifically equivalents of aluminum atoms on the aluminoxane to equivalents of lanthanide atoms in the lanthanide compound (Al/Ln): from ~10:1 to ~50,000:1, preferably from ~75:1 to ~30,000:1, more preferably from ~100:1 to ~1,000:1; and non-coordinating anion or precursor to lanthanide compound (An/Ln): from ~1:2 to ~20:1, preferably from ~3:4 to ~10:1, more preferably from ~1:1 to ~6:1.

The molecular weight of polydienes produced with lanthanide-based catalysts can be controlled by adjusting the amount of catalyst and/or the amounts of co-catalyst concentrations within the catalyst system. In general, increasing the catalyst and co-catalyst concentrations reduces the molecular weight of resulting polydienes, although very low molecular weight polydienes (e.g., liquid polydienes) require extremely high catalyst concentrations which necessitates removal of catalyst residues from the polymer to avoid adverse effects such as retardation of the sulfur cure rate. Including one or more Ni-containing compounds to lanthanide-based catalyst compositions advantageously permits easy regulation of the molecular weight of the resulting polydiene without significant negative effects on catalyst activity and polymer microstructure. Various Ni-containing compounds or mixtures thereof can be employed, with preference given to those which are soluble in hydrocarbon solvents.

The Ni atom in the Ni-containing compounds can be in any of a number of oxidation states, although divalent Ni compounds, where the Ni atom is in the +2 oxidation state, generally are preferred. Exemplary Ni compounds include carboxylates, organophosphates, organophosphonates, organophosphinates, xanthates, carbamates, dithiocarbamates, β-diketonates, alkoxides, aryloxides, halides, pseudohalides, oxyhalides, organonickel compounds (i.e., compounds containing at least one C—Ni bond such as, for example, nickelocene, decamethyl-nickelocene, etc.), and the like.

The molar ratio of the Ni-containing compound to the lanthanide compound (Ni/Ln) generally ranges from ~1:1000 to ~1:1, preferably from ~1:200 to ~1:2, and more preferably from ~1:100 to ~1:5.

These types of catalyst compositions can be formed using any of the following methods:

(1) In situ. The catalyst ingredients are added to a solution containing monomer and solvent (or simply bulk monomer). The addition can occur in a stepwise or simultaneous manner. In the case of the latter, the alkylating agent preferably is added first followed by, in order, the lanthanide compound, the nickel-containing compound (if used), and (if used) the halogen-containing compound or the non-coordinating anion or non-coordinating anion precursor.

(2) Pre-mixed. The ingredients can be mixed outside the polymerization system, generally at a temperature of from about −20° to ~80° C., before being introduced to the conjugated diene monomer(s).

(3) Pre-formed in the presence of monomer(s). The catalyst ingredients are mixed in the presence of a small amount of conjugated diene monomer(s) at a temperature of from about −20° to ~80° C. The amount of conjugated diene monomer can range from ~1 to ~500 moles, preferably from ~5 to ~250 moles, and more preferably from ~10 to ~100 moles, per mole of the lanthanide compound. The resulting catalyst composition is added to the remainder of the conjugated diene monomer(s) to be polymerized.

(4) Two-stage procedure.
  (a) The alkylating agent is combined with the lanthanide compound in the absence of conjugated diene monomer, or in the presence of a small amount of conjugated diene monomer, at a temperature of from about −20° to ~80° C.
  (b) The foregoing mixture and the remaining components are charged in either a stepwise or simultaneous manner to the remainder of the conjugated diene monomer(s) to be polymerized.

(The Ni-Containing Compound, if Used, can be Included in Either Stage.)

When a solution of one or more of the catalyst ingredients is prepared outside the polymerization system in the foregoing methods, an organic solvent or carrier is preferably employed. Useful organic solvents include those mentioned previously.

The production of cis-1,4-polydiene is accomplished by polymerizing conjugated diene monomer in the presence of a catalytically effective amount of a catalyst composition. The total catalyst concentration to be employed in the polymerization mass depends on the interplay of various factors such as the purity of the ingredients, the polymerization temperature, the polymerization rate and conversion desired, the molecular weight desired, and many other factors; accordingly, a specific total catalyst concentration cannot be definitively set forth except to say that catalytically effective amounts of the respective catalyst ingredients should be used. The amount of the lanthanide compound used generally ranges from ~0.01 to ~2 mmol, preferably from ~0.02 to ~1 mmol, and more preferably from ~0.03 to ~0.5 mmol per 100 g conjugated diene monomer. All other ingredients generally are added in amounts that are based on the amount of lanthanide compound (see the various ratios set forth previously).

Polymerization preferably is carried out in an organic solvent, i.e., as a solution or precipitation polymerization where the monomer is in a condensed phase. The catalyst ingredients preferably are solubilized or suspended within the organic liquid. The amount (wt. %) of monomer present in the polymerization medium at the beginning of the polymerization generally ranges from ~3 to ~80%, preferably ~5 to ~50%, and more preferably ~10% to ~30%. (Polymerization also can be carried out by means of bulk polymerization conducted either in a condensed liquid phase or in a gas phase.)

Regardless of whether a batch, continuous, or semi-continuous process is employed, the polymerization preferably is conducted with moderate to vigorous agitation under anaerobic conditions provided by an inert protective gas. The polymerization temperature may vary widely, although typically a temperature of from ~20° to ~90° C. is employed; heat can be removed by external cooling and/or cooling by evaporation of the monomer or the solvent. The polymerization pressure employed may vary widely, although typically a pressure of from about 0.1 to about 1 MPa is employed.

Where 1,3-butadiene is polymerized, the cis-1,4-polybutadiene generally has a $M_n$, as determined by GPC using polystyrene standards, of from ~5000 to ~200,000 Daltons, from ~25,000 to ~150,000 Daltons, or from ~50,000 to ~125,000 Daltons. The polydispersity of the polymers generally ranges from ~1.5 to ~5.0, typically from ~2.0 to ~4.0.

Resulting polydienes advantageously can have a cis-1,4-linkage content of at least ~60%, at least about ~75%, at least about ~90%, and even at least about ~95%, and a 1,2-linkage content of less than ~7%, less than ~5%, less than ~2%, and even less than ~1%.

Regardless of the type of polymerization process employed, at this point the reaction mixture commonly is referred to as a "polymer cement" because of its relatively high concentration of polymer.

Providing a terminal functionality of the type set forth above in formula V can be achieved by functionalizing the polymer prior to quenching, advantageously when it is in the above-described polymer cement state. One method of effecting this functionalization involves introducing to the polymer cement one or more aromatic compounds that include a group capable of reacting with terminally active polymers as well as one or more hydroxyl groups or hydrolyzable groups (i.e., one or more OR substituents) and allowing such compound(s) to react at a terminus of a reactive polymer chain. This type of compound hereinafter is referred to as a terminating compound.

Where the terminating compound includes more than one OR substituent, each can be on the same ring of the aryl group, or two or more can be on different rings within the aryl group. Where the aryl group contains three or more OR substituents, all of them can be on the same ring, two of them can be on one ring with the other(s) being on other ring(s), or each of them can be on separate rings.

A preferred group of terminating compounds include those with an aryl group having at least two OR substituents and, among these, preferred are those where at least two of the OR substituents are on the same ring of the aryl group. Among the latter, particularly preferred are those with OR substituents at the 3 and 4 positions of the same ring within the aryl group, preferably a phenyl group.

Examples of compounds that can be used to provide functionality such as that shown in formula V include those defined by formulas VIIa-VIIg from U.S. Pat. Publ. No. 2010/0286348 A1. In the terminal functionality represented by formula V, $R^6$ and a portion of $R^5$ can be linked so that, together with the atom(s) to which each is attached (directly or indirectly), they form a ring that is bound to or fused with the $R^5$ aryl group; this can be represented pictorially by the general formula

(Vb)

where each variable is described as above. These formulas are to be considered exemplary and not limiting. Not specifically shown in these but included within the scope of useful compounds are those having aryl groups other than phenyl groups, those having aryl groups not directly bonded to the carbonyl C atom, those with the carbonyl C atom bonded to an S atom rather than O (i.e., thioketo analogs), those where Z' is other than a single bond, and the like. Where $R^5$ is other than a phenyl group, the hydroxyl substituent groups can be on the same or different rings; when they are on more than one ring, it is preferred that they be at least somewhat proximate, i.e., that they be directly bonded to ring C atoms that are separated by no more than 4, preferably 3, and even more preferably 2, other ring atoms.

As suggested above, the compound itself need not include hydroxyl groups and, instead, can include groups that are easily hydrolyzable so as to provide hydroxyl groups after reaction. Protected compounds generally have structures similar to those of formulas VIIa-VIIg from U.S. Pat. Publ. No. 2010/0286348 A1 with $OR^4$ groups in place of some or all of the OH groups; see, e.g., formula VIII from U.S. Pat. Publ. No. 2010/0286348 A1.

Each of the compounds just discussed include a carbonyl group. Carbonyl groups provide convenient points for reaction with and attachment to carbanionic polymer chains. Non-limiting examples of other potentially useful reactive groups include aldehyde, (thio)ketone, (thio)ester, di(thio)ester, amide, epoxy, halosilane, and the like.

Other functionalizing compounds, which involve some type of carbon-to-nitrogen multiple bond-containing group as the moiety that reacts with the reactive polymer, that can be employed are described in international patent publ. no. WO 2011/002930.

Reaction of these types of functionalizing compounds with a pre-made reactive polymer can be performed relatively quickly (a few minutes to a few hours) at moderate temperatures (e.g., 0° to 75° C.).

The amount of such compounds to be reacted with premade reactive polymers can vary widely, depending significantly on the degree of desired effect, the amount of non-conventional filler(s) employed, the ratio of conventional-to-non-conventional filler particles, and the like. Based on the amount of reactive polymer chains (generally determined based on the equivalents of initiator or catalyst), the amount of terminating compounds capable of providing a formula V-type functionality can range from ~1:10 to ~5:4, generally from ~1:5 to ~9:8, and typically from ~1:2 to ~1:1.

Lesser amounts of functionalizing (terminating) compounds of the type just described can be employed in certain embodiments so as to preserve some reactive polymer terminals for reaction with other functionalizing agents, which can be added before, after, or with the compounds just discussed; this type of multiple functionalization can be avoided, at least to some extent, through use of functional initiators as discussed previously. Also, at least some embodiments of polymers having functionalities defined by formulas V and Vb, as well as protected analogs, can exhibit excellent interactivity with carbon black and silica, thereby avoiding the need for multiple functionalization reactions.

Where the foregoing type of terminating compound is not employed but the macromolecule includes at least one functionalizing unit derived from either or both of the initiator and a formula VI-type monomer, additional functionalization can result from termination with a heteroatom-containing compound including, but not limited to, Sn, Si, and N. Specific examples of alternative or additional terminating compounds include 1,3-dimethyl-2-imidazolidinone, 3-bis(trimethylsilyl)aminopropyl-methyldiethoxysilane, as well as those described in U.S. Pat. Nos. 3,109,871, 4,647,625, 4,677,153, 5,109,907, and 6,977,281, and references cited in, and later publications citing, these patents.

At this point, the resulting polymer includes one or more types of polyene mer and at least one functionalizing unit which includes an aryl group having at least one directly bonded OR substituent. The functionalizing unit(s) can be derived from the initiating compound, the monomer(s), or a terminating compound. In certain aspects, more than one of the functionalizing units can be incorporated, and these can result from multiple mer, from an initiator plus one or more mer, a terminating group plus one or more mer, or from all three. For reasons not yet completely understood, a polymer with formula V-type terminal functionality might maximize beneficial properties, both in type and degree, in at least some types of rubber compositions.

The identity of the R moiety of the substituent (i.e., whether it is a H atom or a protecting group) depends on the origin of the unit of which it is a part. Units derived from an initiator and/or monomers will have $OR^4$ groups while units derived from a terminating compound can have OR groups. Ensuring that most, preferably all, protecting groups are converted to H atoms typically is desirable so as to promote maximum interactivity with filler particles (when the polymer is used as part of a rubber composition). The processing steps (including quenching) described below can be sufficient to hydrolyze at least some of the protecting groups, thereby providing one or more hydroxyl substituents to one or more aryl groups within polymer. Alternatively, a separate reaction step designed to promote extensive, preferably complete, hydrolysis can be employed; from the exemplary technique employed in several of the examples below, the ordinarily skilled artisan can envision other potentially effective reactions. Further, the ordinarily skilled artisan understands that OR groups, regardless of where present, may undergo further reaction during this processing and/or compounding with one or more types of particulate fillers (described below).

Quenching can be conducted by stirring the polymer and an active hydrogen-containing compound, such as an alcohol or acid, for up to ~20 minutes at temperatures of from ~25° to ~150° C.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

Resistance to cold flow is one way in which rubbery (elastomeric) polymers sometimes are characterized. Samples can be prepared by melt pressing 2.5 g of polymer at 100° C. for 20 minutes in a mold using a preheated press; resulting cylindrical samples, which have a uniform thickness (commonly ~12 mm) are allowed to cool to room temperature before being removed from the mold. Samples are placed individually under a calibrated weight (commonly 5 kg) in a Scott™ tester. Tests are conducted for a set amount of time starting from the point that the weight is released (commonly ~30 min. for SBR samples and ~8 min. for polybutadiene samples), with sample thicknesses being recorded as a function of time. Sample thickness at the conclusion of the appropriate time generally is considered to be an acceptable indicator of cold flow resistance.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric compounds (i.e., rubber compositions) typically are filled to a volume fraction, which is the total volume of filler(s) added divided by the total volume of the elastomeric stock, of ~25%; accordingly, typical (combined) amounts of reinforcing fillers is ~30 to ~100 phr.

Potentially useful carbon black materials include, but not limited to, furnace blacks, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765. The carbon blacks may be in pelletized form, although unpelletized carbon black (flocculent mass) can be preferred for use in certain mixers.

The amount of carbon black utilized historically has been up to ~50 phr, with ~5 to ~40 phr being typical. For certain oil-extended formulations, the amount of carbon black has been even higher, e.g., on the order of ~80 phr.

Amorphous silica ($SiO_2$) also commonly is used as a filler. Silicas typically are produced by a chemical reaction in water, from which they are precipitated as ultrafine, spherical particles which strongly associate into aggregates and, in turn, combine less strongly into agglomerates. Surface area gives a reliable measure of the reinforcing character of different silicas, with BET (see; Brunauer et al., *J. Am. Chem. Soc., vol.* 60, p. 309 et seq.) surface areas of less than 450 $m^2/g$, commonly between ~32 to ~400 $m^2/g$, and typically ~100 to ~250 $m^2/g$, generally being considered useful. Commercial suppliers of silica include PPG Industries, Inc. (Pittsburgh, Penna.), Grace Davison (Baltimore, Md.), Degussa Corp. (Parsippany, N.J.), Rhodia Silica Systems (Cranbury, N.J.), and J. M. Huber Corp. (Edison, N.J.).

Aggregate particles are intended to provide the properties of two types of fillers, particularly carbon black and silica, in a single type of particle; see, e.g., U.S. Pat. Nos. 6,197,274, 6,541,113, 7,199,176 and the like. Formation of in situ synthesized siliceous fillers also is known; see, e.g., U.S. Pat. Nos. 6,172,138, 6,359,034 and the like. Additionally, several clays, including kaolin, include oxides of silicon as part of their compositions, regardless of the physical form of the clay (particulate or otherwise). These are three examples of fillers which include oxides of silicon but which, in the strictest sense, are not silica.

Rubber compositions that include the type of functionalized polymer described above and one or more particulate fillers based in whole or part on oxides of silicon can be difficult to process; more specifically, such compositions tend to exhibit extremely high compound Mooney viscosity values, which increases the amount of energy and time needed to process them. Addition of one or more compounds that can reduce the compound Mooney viscosity of such compositions can be advantageous. Adding compounds with two or more hydroxyl groups (such as those defined by formula I, particularly those where a≥3), have been found to significantly reduce compound Mooney viscosity values of rubber compositions while, surprisingly, having little to no negative impact on the physical properties of vulcanizates made from those compositions.

To ensure good dispersion in rubber compositions, processing viscosity modifying compounds should be liquid (or at least exhibit low viscosity) at processing temperatures, which typically range from ~90° to ~170° C., as detailed below. Those compounds that are solid at ambient temperatures (~10° to ~25° C.) can simplify handling and processing. Solid compounds with melting points above the minimum but below the maximum processing temperatures shown above, particularly those having a melting point of from ~90° to ~165° C., from ~95° to ~160° C., or from ~100° to ~155° C., are particularly preferred.

In addition to multiple hydroxyl groups, the processing viscosity modifying compound also can contain any of a variety of other functionalities. Non-limiting examples of such additional functionalities include ester, ether, acid, and amide groups.

Exemplary processing viscosity modifying compounds include, but are not limited to, any of a variety of aromatic compounds (formula I compounds in which $R^1$ is an aryl group, typically a phenyl ring) including catechols, benzenetriols, gallates, and the like, any of which can include additional substituents such as alkyl groups. Also potentially useful are alkyl polyols (formula I compounds in which $R^1$ is an alkyl group) including diols (glycols) and triols such as glycerol.

Relatively small amounts of the viscosity modifying compound(s) can be employed in the rubber composition. For example, amounts less than 10 phr, 8 phr, 6 phr and even 4 phr have been found to be effective. Typically, such compound(s) can be employed at from ~0.1 or ~0.5 to ~9 phr, from ~0.2 or ~0.75 to ~7.5 phr, from ~0.3 or ~1 to ~5 phr, and even from ~0.4 or ~1.5 to ~3 phr. The viscosity modifying compound(s) can be added at any one or more of the processing stages, described in more detail below, although inclusion at the earliest stage (masterbatch) often provides maximum benefit.

Addition of a coupling agent such as a silane is customary when silica or another silicon-containing filler is present in a rubber compound or composition. Generally, relative to the weight of silicon oxide-containing filler present in the compound, the amount of added silane(s) can be as high as ~20%, typically between ~0.5 and ~15% and, in the case of passenger vehicle tire treads, commonly less than 12% or even less than 10%, with all of the foregoing percentages being w/w. Minimum amounts of silane(s) generally depend on the lowest amount of coupling effect deemed acceptable; this amount often ranges from 1 to 7%, commonly from ~1.5 to ~5% and typically from ~2 to ~4%. (Ranges formed by combining these lower and upper amounts also are envisioned.)

Common silane coupling agents have the general formula A-T-G in which A represents a functional group capable of bonding physically and/or chemically with a group on the surface of the silica filler (e.g., surface silanol groups); T represents a hydrocarbon group linkage; and G represents a functional group capable of bonding or reacting with the polymeric chain of the elastomer, typically a sulfur-containing group that can react with unsaturation in the polymer chain. Such coupling agents include organosilanes, in particular polysulfurized alkoxy-silanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. Commercially available examples of such materials include bis-(3-triethoxysilylpropyl)-tetrasulfide (Si 69™) and bis(triethoxysilylpropyl)poly-sulfide (Si 75™), both available from Evonik Degussa GmbH.

The foregoing conventional silanes, i.e., ones designed to link silica to a polymer via unsaturation in its chain, can be replaced in part by one or more compounds designed to link silica particles (as well as other types of silicon-containing fillers) to functionalized polymers through the OR moieties, particularly those at a terminus of the polymer, as opposed to a part of the polymer chain. These compounds include an active hydrogen atom-containing group such as hydroxyl, thiol, and primary or secondary amino groups, each of which is capable of covalently bonding to one or more OR (typically OH during compounding) moieties. The amino alternatives can be represented as —NHR$^2$ where R$^2$ is H or a substituted or unsubstituted hydrocarbyl group, typically a substituted or unsubstituted alkyl group. Non-limiting examples of substituted hydrocarbyl groups include —(CH$_2$)$_z$NH(CH$_2$)$_z$NR$^2$$_2$, —(CH$_2$)$_z$NR$^2$$_2$, —(CH$_2$)$_z$L, —(CH$_2$)$_z$NH(CH$_2$)$_z$L, and the like, with z being an integer of from 1 to 12, preferably 1 to 6, and most preferably 1 to 3. In the foregoing, L represents a group that contains at least one silicon-to-oxygen (Si—O) bond, often two or even three Si—O bonds, i.e., a silicon atom bonded to multiple oxygen atoms. Where the Si atom of the L group is not bonded to three O atoms, the Si atom typically will be bonded to one or two hydrocarbyl groups (including cyclic groups, which involve the Si atom being bonded to each of the opposite ends of the hydrocarbyl group). Non limiting examples of representative L groups include —SiR$^{11}$$_m$(OR$^{11}$)$_{3-m}$ and

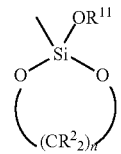

where R$^2$ is as defined above, with each R$^2$ preferably being H; R$^H$ is a substituted or unsubstituted hydrocarbyl group such as an aryl, alkyl, alkenyl, alkenaryl, aralkenyl, alkaryl, or aralkyl group, often a C$_1$-C$_6$ alkyl group; m is 1 or 2; and n is an integer of from 2 to 5 inclusive, typically 2 or 3. The L group is linked to the active hydrogen atom-containing group through a hydrocarbylene group such as an arylene, alkylene, alkenylene, alkenarylene, aralkenylene, alkarylene, or aralkylene group, although an alkylene group with less than 12, or even less than 10, carbon atoms can be desirable for steric reasons.

Examples of such compounds include aminosilanes such as aminopropyltriethoxysilane, aminopropyltrimethoxysilane, 4-aminobutyltriethoxysilane, 3-aminopropyltris-(methoxyethoxyethoxy)silane, N-(2-aminoethyl)-3-aminopropyltrimethoxysilane, N-(2-amino-ethyl)-3-aminopropyltriethoxysilane, N-(6-aminohexyl)aminomethyltrimethoxysilane, N-(6-aminohexyl)aminopropyltrimethoxysilane, N-(2-aminoethyl)-11-aminoundecyltrimethoxysilane, m-aminophenyltrimethoxysilane, p-aminophenyltrimethoxysilane, (aminoethylaminomethyl)-phenethyltrimethoxysilane, N-3-[(amino(polypropylenoxy)]aminopropyltrimethoxysilane, (3-trimethoxysilylpropyl)diethylenetriamine, and 3-thiocyanatopropyltriethoxysilane. Preferred for at least some application are those compounds that include at least one primary amino group.

As an alternative to adding such a silane as a separate component, the rubber composition can employ filler particles that include oxides of silicon (e.g., silica) with bound residues (i.e., radicals) of one or more such compounds. In these functionalized particles, the silicon atom from the silane forms one or more Si—O bonds with functional groups on the surface of the filler particle so as to link the silane to the particle. The other end of the silane residue remains available for covalently bonding with OR moieties (or oxidized variants) from the functionalized polymer. Non-limiting examples of commercially available functionalized filler particles include Ciptane™ I γ-mercaptopropyltrimethoxysilane-treated (~3% (by wt.)) silica (PPG Industries; Monroeville, Penna.), Nulok™ 390 aminosilane-treated kaolin clay (KaMin LLC; Macon, Ga.), Nylok™ 171 aminosilane-treated kaolin clay (KaMin LLC), Nucap™ 190W sulfur-functional, silane-treated kaolin clay (KaMin LLC).

The amount of conventional silane employed can be reduced by including in the composition up to ~40 phr, typically up to ~20 phr, of one or more additives (e.g., urea, sodium sulfate or fatty acid esters of sugars such as those described in U.S. Pat. No. 6,525,118) and/or mineral fillers such as clays, talc, or micas.

Silica, alone or as a portion of a blend of silicon-containing fillers, commonly is employed in amounts of up to ~150 phr, commonly from ~5 to ~90 phr, typically from ~7 to ~85 phr. The useful upper range is limited by the high viscosity that such fillers can impart. When carbon black also is used, the amount of silica can be decreased to as low as ~1 phr; as the amount of silica decreases, lesser amounts of the silane(s), if any, can be employed.

One or more non-conventional fillers having relatively high interfacial free energies, i.e., surface free energy in water values ($\gamma_{pl}$) can be used in conjunction with or in place of at least a portion of the carbon black and/or silica. For more information on these types of fillers and their manner of incorporation, the interested reader is directed to U.S. Pat. Publ. No. 2008/0161467 A1.

Other conventional rubber additives also can be added. These include, for example, process oils, plasticizers, antidegradants such as antioxidants and antiozonants, curing agents and the like.

All ingredients can be mixed with standard equipment such as, e.g., Banbury or Brabender mixers. Typically, mixing occurs in two or more stages. During the first stage (also known as the masterbatch stage), mixing typically is begun at temperatures of ~120° to ~130° C. and increases until a so-called drop temperature, typically ~165° C., is reached. In addition to the types of materials commonly added during the masterbatch phase, one or more of the viscosity modifying compounds described above can included as an ingredient in this phase.

Where a formulation includes fillers other than carbon black, a separate re-mill stage often is employed for separate addition of the silane component(s) and/or the viscosity modifying compound(s) (either initially or an additional aliquot). This stage often is performed at temperatures similar to, although often slightly lower than, those employed in the masterbatch stage, i.e., ramping from ~90° C. to a drop temperature of ~150° C. Use of a re-mill stage, while common, is not required. Some types of silanes permit mixing at temperatures as high as 170°-180° C., which may allow one or more of the foregoing stages to be omitted.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, Encyclopedia of Chem. Tech., 3d ed., (Wiley Interscience, New York, 1982), vol. 20, pp. 365-468. Vulcanizing agents, accelerators, etc., are added at a final mixing stage. To avoid undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C. Depending on particular components and conditions, vulcanization typically is performed at a temperature of from ~140° to ~170° C.

Certain tests have come to be recognized as correlating certain physical properties of vulcanizates with performance of products, particularly tire treads, made therefrom. For example, reductions in hysteresis (heat build up during operation) have been found to correlate with higher rebound values and lower loss tangent values (tan δ) at high temperature, better handling performance often correlates with higher elastic modulus values at high temperature and strain, ice traction has been found to correlate with lower modulus values at low temperatures, etc. (In the foregoing, "high temperature" typically is considered to be ~50°-65° C. while "low temperature" is considered to be ~0° to –25° C.)

Many desirable properties of vulcanizates (as well as enhanced processability of the rubber compositions from which they are prepared) are achieved when filler particles are well dispersed and exhibit excellent interactivity with the constituent polymers. The section of the polymer chain from the site of the last crosslink to an end of the polymer chain is a major source of hysteretic losses; this free end is not tied to the macromolecular network and thus cannot be involved in an efficient elastic recovery process and, as a result, energy transmitted to this section of the polymer (and vulcanizate in which such polymer is incorporated) is lost as heat. Ensuring that these polymer chain ends are tied to, or otherwise interact well with, reinforcing particulate fillers is important to many vulcanizate physical properties including reduced hysteresis.

The following non-limiting, illustrative examples provide detailed conditions and materials that can be useful in the practice of the invention just described.

EXAMPLES

Examples 1-2

Polymer Synthesis

Two random styrene/butadiene copolymers were prepared using conditions and reactants similar to those employed in polymer synthesis examples 15 and 20 from international patent publ. no. WO 2011/008501, i.e., one initiated with n-butyllithium and quenched with isopropanol and another initiated and terminated with 3,4-dihydroxyphenyl type compounds (styrenic initiator and benzaldehyde terminator).

The resulting copolymers, respectively denominated Examples 1 and 2, had the properties set forth in the following table. Molecular weight data were obtained via gel permeation chromatography using polystyrene standards, and vinyl content was determined by NMR spectrometry.

TABLE 1

| Polymer characteristics | | |
|---|---|---|
| | 1 | 2 |
| $M_w$ (kg/mol) | 152.5 | >1000 |
| $M_n$ (kg/mol) | 144.1 | 206.9 |
| $M_p$ (kg/mol) | 153.2 | 187.3 |
| $M_w/M_n$ | 1.06 | 5.43 |
| % coupled | 1.5 | 37.3 |
| % styrene | 33 | 33 |
| vinyl linkage (%) | 29.7 | 29.7 |

Examples 3-10

Rubber Compositions

Filled compositions were prepared from the polymers from Examples 1-2 using the basic formula shown below in Table 2a where N-phenyl-N'-(1,3-dimethylbutyl)-p-phenylenediamine (6PPD) acts as an antioxidant;

2,2'-dithiobis(benzothiazole) (MBTS), N-tert-butylbenzothiazole-2-sulfenamide (TBBS) and N,N'-diphenylguanidine (DPG) act as accelerators;

black oil is an extender oil that contains a relatively low amount of polycyclic aromatic (PCA) compounds;

the silica employed was Hi-Sil™190G (PPG Industries); and

Si 75™ silane was used as coupling agent.

Three stages of mixing (masterbatch, re-mill and final batch) were carried out for each composition using an internal mixer.

The specific polymers and amounts of processing viscosity modifying compounds employed in particular rubber compositions, as well as the compound Mooney viscosities of these compositions are shown in Table 2b. (Mooney viscosity ($ML_{1+4}$) values were determined with an Alpha Technologies™ Mooney viscometer (large rotor) using a one-minute warm-up time and a four-minute running time.)

TABLE 2a

| Filled compositions, generic formula | |
|---|---|
| | Amount (phr) |
| Masterbatch | |
| synthesized polymer | 80 |
| poly(isoprene) (natural rubber) | 20 |
| propyl gallate | various |
| lauryl gallate | various |
| silica | 52.5 |
| wax | 2 |
| 6PPD | 0.95 |
| stearic acid | 2 |
| black oil | 10 |
| Re-mill | |
| silica | 2.5 |
| silane | 5 |
| Final | |
| sulfur | 1.5 |
| ZnO | 2.5 |
| MBTS | 2.0 |
| TBBS | 0.7 |
| DPG | 1.4 |

TABLE 2b

| Filled compositions, specific information | | | | | | | | |
|---|---|---|---|---|---|---|---|---|
| | 3 | 4 | 5 | 6 | 7 | 8 | 9 | 10 |
| synthetic polymer (example no.) | 1 | 1 | 1 | 2 | 2 | 2 | 2 | 2 |
| propyl gallate (phr) | 0 | 1.5 | 0 | 0 | 0.75 | 1.5 | 0 | 0 |
| lauryl gallate (phr) | 0 | 0 | 1.5 | 0 | 0 | 0 | 0.75 | 1.5 |
| $ML_{1+4}$ at 130° C. | 31.6 | 32.6 | 29.0 | 109.2 | 86.5 | 86.3 | 90.0 | 84.6 |

The compound Mooney viscosity value for a rubber composition employing a difunctional (telechelic) SBR interpolymer using a standard (non-inventive) formula (Example 6) is far higher than that for a composition employing a control SBR interpolymer (Example 3). Rubber compositions employing processing viscosity modifying compounds with that same control polymer (Examples 4-5) show no particular improvement in their compound Mooney viscosity values. However, rubber compositions employing a difunctional polymer with a processing viscosity modifying compound (Examples 7-10) show significant (i.e., at least 20%) reductions in their compound Mooney viscosity values relative to an identical composition not including such a compound.

Examples 11-18

Preparation and Testing of Vulcanizates

The rubber compounds from Examples 3-10 were cured for 45 minutes at 171° C. to provide vulcanizates 11-18. Results of physical testing on these vulcanizates made from these polymers are summarized below in Table 3. Tensile mechanical properties were determined using the standard procedure described in ASTM-D412; strain sweep data (G' and tan δ) were obtained from dynamic experiments conducted at 50° C. and 15 Hz, while temperature sweep data were obtained at 0.5% strain and 10 Hz. With respect to tensile properties, $T_b$ is tensile strength at break and $E_b$ is percent elongation at break.

TABLE 3

| Vulcanizate properties | | | | | | | | |
|---|---|---|---|---|---|---|---|---|
| | 11 | 12 | 13 | 14 | 15 | 16 | 17 | 18 |
| rubber compound (example no.) | 3 | 4 | 5 | 6 | 7 | 8 | 9 | 10 |
| MDR2000 @ 171° C. | | | | | | | | |
| MH (kg · cm) | 26.37 | 26.04 | 25.61 | 25.05 | 24.33 | 25.31 | 25.63 | 25.34 |
| $t_{90}$ (min) | 5.21 | 5.79 | 4.64 | 3.31 | 3.12 | 4.41 | 2.71 | 3.23 |
| Tensile @ 23° C. | | | | | | | | |
| $M_{50}$ (MPa) | 2.17 | 2.11 | 2.15 | 2.22 | 2.12 | 2.15 | 2.23 | 2.21 |
| $M_{100}$ (MPa) | 3.82 | 3.52 | 3.74 | 4.27 | 3.81 | 3.82 | 4.14 | 3.97 |
| $M_{200}$ (MPa) | 7.70 | 6.81 | 7.41 | 9.41 | 7.83 | 7.90 | 8.73 | 8.10 |
| $M_{300}$ (MPa) | 12.26 | 10.72 | 11.41 | 15.56 | 12.67 | 12.85 | 14.21 | 12.81 |
| $T_b$ (MPa) | 17.3 | 16.4 | 15.3 | 19.5 | 18.2 | 18.5 | 17.8 | 16.2 |
| $E_b$ (%) | 397 | 427 | 382 | 362 | 402 | 401 | 358 | 359 |
| toughness (MPa) | 32.05 | 33.00 | 28.45 | 32.56 | 33.88 | 34.43 | 29.55 | 29.01 |
| Strain sweep (50° C., 15 Hz) | | | | | | | | |
| G' @ 9.92% strain (MPa) | 3.20 | 3.67 | 3.58 | 3.14 | 3.14 | 3.45 | 3.16 | 3.40 |
| tan δ @ 9.92% strain | 0.185 | 0.196 | 0.185 | 0.128 | 0.124 | 0.145 | 0.129 | 0.134 |
| Temp. sweep (0.5% strain, 10 Hz) | | | | | | | | |
| T @ peak tan δ (° C.) | −24.0 | −24.0 | −24.1 | −22.0 | −21.9 | −22.1 | −22.0 | −22.0 |
| tan δ @ peak | 0.708 | 0.674 | 0.687 | 0.718 | 0.709 | 0.676 | 0.712 | 0.698 |

The foregoing data show that the physical properties of vulcanizates made from compositions employing a difunctional SBR interpolymer and a processing viscosity modifier are quite comparable to those of a vulcanizate made from an identical composition not including such a modifying compound. Thus, while the compound Mooney viscosity data of Table 2b indicate that the presence of such modifiers provide processing advantages, the data of Table 3 indicate that such modifiers do not negatively impact (significantly) the physical properties of vulcanizates provided from such compositions.

Compounds employing Duradene™ 706 non-functionalized SBR interpolymer (Firestone Polymers; Akron, Ohio) were prepared using the formulas from Tables 2a and 2b, and vulcanizates were prepared from those compounds. Results followed the same general trends as Examples 3-5 (rubber compositions) and 11-13 (vulcanizates).

Similarly, compositions employing 0.75 phr processing viscosity modifier with a different type of functionalized SBR interpolymer—one terminated (functionalized) by reaction with 3-aminopropylmethyldiethoxysilane—as the synthetic polymer from Table 2a did not show any particular advantage in compound Mooney viscosity values relative to an identical composition that did not include a processing viscosity modifying compound. This tends to indicate that the particular functionalized polymer described above is the type that benefits from the presence of such a processing viscosity modifying compound.

Examples 19-26

Rubber Compositions

Filled compositions were prepared from the polymers from Examples 1-2 using the basic formula shown below in Table 4a, with the various components being defined as above in connection with Table 2a.

TABLE 4a

| Filled compositions, generic formula | |
|---|---|
| | Amount (phr) |
| Masterbatch | |
| SBR interpolymer | 100 |
| carbon black (N343 type) | 50 |
| propyl gallate | various |
| lauryl gallate | various |
| wax | 2 |
| 6PPD | 0.95 |
| stearic acid | 2 |
| black oil (low PCA content) | 10 |
| Final | |
| sulfur | 1.5 |
| MBTS | 0.5 |
| DPG | 0.3 |
| TBBS | 0.5 |
| ZnO | 2.5 |

| Filled compositions, specific information | | | | | | | | |
|---|---|---|---|---|---|---|---|---|
| | 19 | 20 | 21 | 22 | 23 | 24 | 25 | 26 |
| synthetic polymer (example no.) | 1 | 1 | 1 | 2 | 2 | 2 | 2 | 2 |
| propyl gallate (phr) | 0 | 1.5 | 0 | 0 | 0.75 | 1.5 | 0 | 0 |
| lauryl gallate (phr) | 0 | 0 | 1.5 | 0 | 0 | 0 | 0.75 | 1.5 |
| $ML_{1+4}$ at 130° C. | 42.6 | 43.5 | 43.2 | 121.0 | 127.6 | 121.4 | 126.8 | 128.7 |

The compound Mooney viscosity value for a carbon black-filled rubber composition employing a difunctional (telechelic) SBR interpolymer using a standard (non-inventive) formula (Example 22) again is far higher than that for a composition employing a control SBR interpolymer (Example 19). However, unlike the prior silica compounds, neither rubber compositions employing processing viscosity modifying compounds with the control polymer (Examples 20-21) nor the difunctional polymer (Examples 23-26) show any particular improvement in compound Mooney viscosity values. This is interpreted as indicating that the processing viscosity modifying compounds do not tend to interfere with the interaction between the terminal functionalities of the polymer and the carbon black filler particles during processing.

Vulcanizates prepared from these rubber compositions exhibited similar trends (i.e., no particular advantage or disadvantage based on the presence of a processing viscosity modifying compound) as in Examples 11-18.

That which is claimed is:

1. A process for providing a composition, said process comprising:
   (a) blending in one or more stages involving varied temperature profiles
      (1) a polymer comprising ethylenic unsaturation and pendent or terminal functionality that comprises an aryl group comprising at least two OR substituents, wherein R is H or a hydrolyzable group,
      (2) filler particles that comprise oxides of silicon, and
      (3) from about 1.5 to about 3 phr of a compound that comprises at least one aromatic ring with more than one hydroxyl group, said compound having a melting point of from about 40° to about 165° C., and
   (b) adding a vulcanizing agent to the product of step (a) and performing additional mixing at a temperature lower than that employed in step (a),
thereby providing said composition, said composition having a compound Mooney viscosity at 130° C. that is less than that of an identical composition in which said compound is not present.

2. The process of claim 1 further comprising heating said composition to a temperature at which said vulcanizing agent cures said composition, thereby providing a vulcanizate.

3. The process of claim 1 wherein said polymer comprises terminal functionality, said terminal functionality comprising an aryl group that comprises at least two OR substituents.

4. The process of claim 3 wherein said polymer is defined by the formula $$\kappa\text{-}\pi\text{-}Q'ZR^5$$

where
   π is a polymer chain;
   κ is a hydrogen atom or a radical of a functional group-containing compound;
   Z is a single bond or a substituted or unsubstituted (cyclo)alkylene or arylene group;
   $R^5$ is an aryl group that includes at least one OR substituent group with R being H or a hydrolyzable group; and
   Q' is the residue of an initiating moiety bonded to the polymer chain through a C, N or Sn atom.

5. The process of claim 3 wherein said terminal functionality is defined by

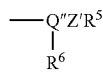

where
   Z' is a single bond or an alkylene group;
   $R^5$ is an aryl group that includes at least one OR substituent group;
   $R^6$ is H, a substituted or unsubstituted aryl group, R', or JR' where J is O, S, or —NR' where each R' independently being a substituted or unsubstituted alkyl group; and
   Q" is the residue of a functionality that is reactive with at least one type of reactive polymers but which itself is non-reactive toward such polymers.

6. The process of claim 5 wherein $R^6$ is an aryl group that comprises one or more OR substituents with R being H or a hydrolyzable group.

7. The process of claim 5 wherein $R^6$ and a portion of $R^5$ are linked so that, together with the atoms to which each is attached, they form a ring bound or fused to the $R^5$ aryl group.

8. The process of claim 1 wherein said compound comprising more than one hydroxyl group is a gallate.

9. The process of claim 1 wherein said vulcanizing agent is accompanied by at least one antioxidant.

10. The process of claim 1 wherein said composition has a compound Mooney viscosity at 130° C. that is at least 20% less than an identical composition in which said compound is not present.

11. The process of claim 1 wherein said filler particles consist of oxides of silicon.

12. A method for providing a modified filled rubber composition from an original filled rubber composition that comprises (1) a polymer that comprises ethylenic unsaturation and pendent or terminal functionality that comprises an aryl group comprising at least two OR substituents, wherein R is H or a hydrolyzable group, and (2) filler particles that comprise oxides of silicon, said modified composition having a compound Mooney viscosity at 130° C. that is less than that of said original composition, said process comprising:
   (a) at a temperature that increases from onset to completion, providing a masterbatch by mixing ingredients that comprise said polymer and from about 1.5 to about 3 phr of at least one processing viscosity modifying compound that comprises at least one aromatic ring with more than one hydroxyl group, said compound having a melting point of from about 40° to about 165° C.;
   (b) to said masterbatch, adding ingredients that comprise said filler particles to provide a filler-containing blend;
   (c) to said filler-containing blend, adding ingredients that comprise a vulcanizing agent;
   (d) performing additional mixing under an increasing temperature profile where both the onset and completion temperatures are lower than those used in providing said masterbatch;
   (e) recovering said modified filled rubber composition.

13. The method of claim 12 wherein said filler particles consist of oxides of silicon.

14. The method of claim 12 wherein said polymer chain further comprises pendent aromatic groups.

15. The method of claim 14 wherein said polymer comprises random microstructure.

16. The method of claim 12 wherein said polymer comprises terminal functionality, said terminal functionality comprising an aryl group that comprises at least two OR substituents.

17. The method of claim 16 wherein said polymer is defined by the formula $$\kappa\text{-}\pi\text{-}Q'ZR^5$$

where
- π is a polymer chain;
- κ is a hydrogen atom or a radical of a functional group-containing compound;
- Z is a single bond or a substituted or unsubstituted (cyclo)alkylene or arylene group;
- $R^5$ is an aryl group that includes at least one OR substituent group with R being H or a hydrolyzable group; and
- Q' is the residue of an initiating moiety bonded to the polymer chain through a C, N or Sn atom.

18. The method of claim 16 wherein said terminal functionality is defined by

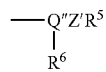

where
- Z' is a single bond or an alkylene group;
- $R^5$ is an aryl group that includes at least one OR substituent group;
- $R^6$ is H, a substituted or unsubstituted aryl group, R', or JR' where J is O, S, or —NR' where each R' independently being a substituted or unsubstituted alkyl group; and
- Q" is the residue of a functionality that is reactive with at least one type of reactive polymers but which itself is non-reactive toward such polymers.

19. The method of claim 18 wherein $R^6$ is an aryl group that comprises one or more OR substituents with R being H or a hydrolyzable group or wherein $R^6$ and a portion of $R^5$ are linked so that, together with the atoms to which each is attached, they form a ring bound or fused to the $R^5$ aryl group.

20. The method of claim 12 wherein said ingredients added in step (c) further comprise at least one antioxidant.

* * * * *